United States Patent [19]

Vella et al.

[11] Patent Number: 4,551,019
[45] Date of Patent: Nov. 5, 1985

[54] MEASURING CHROMATIC DISPERSION OF FIBERS

[75] Inventors: Paul J. Vella, Kanata; Philip M. Garel-Jones, Ottawa; Richard S. Lowe, Kanata, all of Canada

[73] Assignee: Northern Telecom Limited, Montreal, Canada

[21] Appl. No.: 521,003

[22] Filed: Aug. 8, 1983

[30] Foreign Application Priority Data

Jun. 6, 1983 [CA] Canada ................................. 429,734

[51] Int. Cl.⁴ .............................................. G01N 21/84
[52] U.S. Cl. .................................................... 356/73.1
[58] Field of Search ....................................... 356/73.1

[56] References Cited

U.S. PATENT DOCUMENTS 4,257,707 3/1981 Liertz et al. ....................... 356/73.1

OTHER PUBLICATIONS

Costa et al., "Highly Accurate & Simple Technique for Material Dispersion Measurements in optical Fibers" Gselt Rapporti Tecnici, vol. IX-N5 (Oct. 1981), pp. 453-456.
Jeunhomme et al., "Wavelength Dependence of Modal Dispersion in grated Index Fibers" Electronics Letters, Jun. 8, 1978, vol. 14 #12, pp. 364-366.
Franzen et al., "Measurement of Propagation Constants Related To Material Properties in High-Band width Optical Fibers" IEEE, Tour of Quan. Electronics, vol. qE15, No. 12, Dec. 1979, pp. 1409-1414.

*Primary Examiner*—Vincent P. McGraw
*Attorney, Agent, or Firm*—Stuart L. Wilkinson

[57] ABSTRACT

The chromatic dispersion of an optical fiber such as a 10 to 50 km length of single mode fiber is measured by launching into the fiber the outputs of at least three commonly modulated semiconductor lasers having output wavelengths close to a region of minimum chromatic dispersion of the fiber. At a remote end of the fiber the relative phases of the signals from the three lasers are determined and a chromatic dispersion profile of the fiber is derived from the measured relative phases and the output wavelenghts of the lasers by assuming a parabolic relationship between signal propagation times and wavelength. The profile can be determined by defferentiating a parabolic function fitted to the three date points derived using said three lasers or by directly generating a linear relationship between chromatic dispersion and wavelength on the basis of two values of chromatic dispersion derived from these three data points.

12 Claims, 3 Drawing Figures

MEASURING CHROMATIC DISPERSION OF FIBERS

This invention relates to a method and apparatus for measuring the chromatic dispersion of optical fibers. The technique is particularly applicable to measuring the chromatic dispersion of single mode fiber links of 10 to 50 km in length.

An important parameter in the qualification of single mode fibers is chromatic dispersion which may be defined as the variation of propagation time as a function of wavelength within a fiber. The chromatic dispersion, also called wavelength or intramodal dispersion, increases with the spectral spread of a light source and increases also, at least in conventional fiber optic glasses, away from a minimum dispersion region corresponding to a wavelength of about 1.3 microns. Together with attenuation, chromatic dispersion determines the span lengths achievable when using high data rates in the order of 400 megabits per second envisaged for monomode fiber.

The most accurate known method for measuring chromatic dispersion employs a Nd:Yag laser which requires sophisticated equipment and specialized personnel for operation. This is clearly not a technique suitable either for a field or factory environment.

A known field technique developed by Fujitsu Electronics uses the fact that the spectrum of a solid state laser consists of a number of discrete longitudinal modes that can be characterized in terms of wavelength $\lambda$ and relative amplitude, $\alpha$.

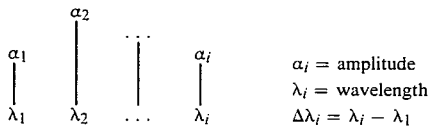

$\alpha_i$ = amplitude
$\lambda_i$ = wavelength
$\Delta\lambda_i = \lambda_i - \lambda_1$ If a modulating signal of the form:

$$A = \exp(-jwt),$$

is applied to a laser diode the laser output can be rewritten as:

$$A = \sum_{i=1}^{N} \alpha_1 \cdot \exp[-jw(t - t_1)]$$

Here $t_i$ is the relative signal time delay between laser modes excited at wavelengths $\lambda_1$ and $\lambda_i$ and can be expressed in terms of chromatic dispersion m (ps/km/nm), relative wavelength $\Delta\lambda_i$ (nm) and link length L(km). Writing $t_i = m\Delta\lambda_i \cdot L$ yields the equation:

$$A = \Sigma \alpha_i \cdot \exp[-j\, 2\pi\sigma(t - m\Delta\lambda_i L)]$$

$$= \sum_1^i \alpha_i \exp(-jwt)\exp(jm\Delta\lambda_i L 2\pi\sigma)$$

From this, the amplitude Ao is given by $$A_o = \sum_i \alpha_i \exp(jm \cdot \Delta\lambda_i L 2\pi\sigma) \qquad (1)$$

which should describe the roll-off of the power as a function of frequency or the baseband response of the fiber.

Experimentally, the dB roll-off is measured at a number of discrete frequencies from 100 MHz to 1000 MHz for the fiber link. The chromatic dispersion, m is obtained by fitting to Equation 1 by the method of least squares. The values of $a_i$ and $\Delta\lambda_i$ are measured at the input end of the link using a waveform analyser and are assumed invariant with time and frequency. The resulting chromatic dispersion m is now known at the mean wavelength of the laser. To infer the performance over a range of wavelengths bracketing the dispersion minimum, one assumes a slope for the chromatic dispersion curve and draws this curve through the measured point. This is a serious disadvantage of this technique.

Other limitations of this approach are:

(i) the method is indirect in that it does not measure time or phase delay;
(ii) it is assumed that the amplitudes of the laser modes remain constant over the range of modulation frequencies;
(iii) the method relies strongly on the ability to measure the spacing between the longitudinal modes precisely; and
(iv) to date measurements extend only to 1,000 MHz since aB roll-off in most single mode fibers is just starting at this frequencly. The fitting procedure weights this point heavily.

Yet another technique described by B. Costa, D. Mazzon, M. Puleo, E. Vazzoni, IEEE J. Quant. Elect. QE-18, 10, 1509 (1982) uses LED's which spectrally cover the wavelength range 0.75-1.6 $\mu$m.

Relative time delays are measured by observing the phase of the modulated signal on a vector voltmeter. This is done as a function of wavelength, $\lambda$ by allowing the signal to pass through a monochromator before being collected on a photodetector. A graph of relative time delay against $\lambda$ is plotted, and a standard formula is fitted to the data. Chromatic dispersion is obtained by differentiating the fitted curve.

The LED technique is not adapted for field measurement. It is more suited to laboratory or factory measurement of chromatic dispersion over a wide wavelength range without having to set up an expensive YAG Raman system. The technique has been used only for short lengths of multimode fiber of the order of 1 km having a rather large core of the order of 60 microns. Even with these short spans it is difficult to adapt the technique to single mode fiber fiber and, consequently, the low optical power reaching a light detector at the remote end of the link. To compound this, the lack of adequate optical power from an LED after the output has been passed through a monochromator means that the technique is very difficult to implement in the field where single mode fiber links of about 40 km have to be tested routinely.

A modification of the last mentioned technique is now proposed which enables field measurement of the chromatic dispersion of long lengths of single mode fiber.

According to one aspect of the invention, there is provided a method of measuring chromatic dispersion of optical fiber comprising launching into the fiber at least three commonly modulated laser output signals having different output wavelengths close to a region of minimum chromatic dispersion of the fiber, determining relative phases of the signals at a remote end of the fiber, and deriving a chromatic dispersion-wavelength profile of the fiber from the relative phases and the output wavelengths of said lasers.

For laser test wavelengths of $\lambda_a$, $\lambda_b$ and $\lambda_c$ and respective propagation times $t_a$, $t_b$ and $t_c$ through the fiber, a chromatic dispersion profile is derived on the basis of an approximately parabolic relationship existing between wavelength and relative delay of the signals at the test wavelength. Alternatively, the chromatic dispersion profile can be derived on the basis of an approximately linear relationship known to exist between chromatic dispersion (m) and wavelength ($\lambda$) near the minimum dispersion wavelength. Two chromatic dispersion values $m_1$ and $m_2$ are measured using the relationship:

$$m_1 = \frac{t_a - t_b}{\lambda_a - \lambda_b} \text{ at wavelength } \lambda_1 = \frac{\lambda_a + \lambda_b}{2};$$

$$m_2 = \frac{t_b - t_c}{\lambda_b - \lambda_C} \text{ at wavelength } \lambda_2 = \frac{\lambda_b + \lambda_c}{2}$$

The linear chromatic dispersion wavelength profile is derived from these two values.

The method of the invention depends on the output wavelengths of the test lasers being close to the minimum chromatic dispersion region of the fiber since it is only in this region that the propagation times as a function of wavelength vary approximately parabolically and chromatic dispersion varies linearly with wavelength.

Particularly for field measurement, a reference signal can be launched into a reference fiber co-extensive with the fiber under test, the reference laser being commonly modulated with the test lasers. The test and reference signals received at the remote end of the link can be detected using avalanche photodiodes. The outputs of the photodiodes can be directed through phase locked loops to improve the signal to noise ratio of the received signals. This is especially important for the reference signal.

For glasses commonly used in momomode fiber the chromatic dispersion minimum is at about 1.3 microns and, typically, test lasers having essentially single mode outputs within the range 1.28 to 1.32 microns can be used. More than three lasers may be used in performing the test but in the apparatus and method according to this invention, three are essential.

The relative delays of the various wavelength components can be measured by comparing the phase of the signals from the test fiber to the phase of the signal to the reference fiber. The modulation frequency chosen depends on fiber length and is selected to give the highest possible frequency to enable accurate phase comparison commensurate with an integer value of modulation wavelengths propagating down the length of fiber at one test wavelength not being different from that at another test wavelength.

A modulation frequency of about 100 MHz equivalent to a full cycle time of about 10 nsec has been found suitable for fibers links in the range of 10 to 50 km in length.

According to another aspect of the invention there is provided apparatus for measuring the chromatic dispersion of a test fiber for wavelengths close to the minimum chromatic dispersion wavelength of the fiber, the apparatus comprising three test lasers having output wavelengths different from one another but close to the minimum chromatic dispersion wavelength of the fiber, means for commonly modulating the outputs of the lasers at a predetermined frequency, means for launching the outputs of the test lasers into the test fiber, means at a remote end of the fiber for generating an electrical signal corresponding to light output of the fiber, means for analysing the signals to determine relative propagation times at the three different wavelengths, and means for deriving from the relative propagation times and from the wavelengths of the test lasers, the chromatic dispersion of the test fiber for a range of wavelengths encompassing said minimum chromatic dispersion wavelength.

Preferably the apparatus also includes a refrence laser commonly modulated with the test lasers and a reference fiber co-extensive with the test fiber. A reference signal received from the reference fiber can then be used to determine the relative propagation times at the test wavelength.

Particularly for measuring the chromatic dispersion of long lengths of monomode fiber, the lasers can be monomode GaInAsP semiconductor lasers having output wavelengths close to 1.3 microns and separated by about 20 nm. The lasers are preferably coupled to the test fiber through pigtail fibers which can be selectively switched to direct one or other laser output into the test fiber. The pigtail fibers can be trimmed to a predetermined length so that they introduce identical phase delays.

The apparatus can include an oscillator for commonly modulating the laser outputs at a frequency of about 1000 MHz for a fiber of 10 to 50 km in length. The frequency can be varied to optimize it for the length of fiber being tested.

The apparatus can also include avalanche photodetectors to detect light from the test and reference fibers. The detector outputs can be directed to phase locked loops at the remote end of the fiber to improve signal to noise ratio of the test and reference signals. The outputs of the phase locked loops can be fed to a phase comparator such as a vector voltmeter in order to derive the relative propagation times at the different wavelengths.

An embodiment of the invention will now be described by way of example with reference to the accompanying drawings in which.

Figure 1:
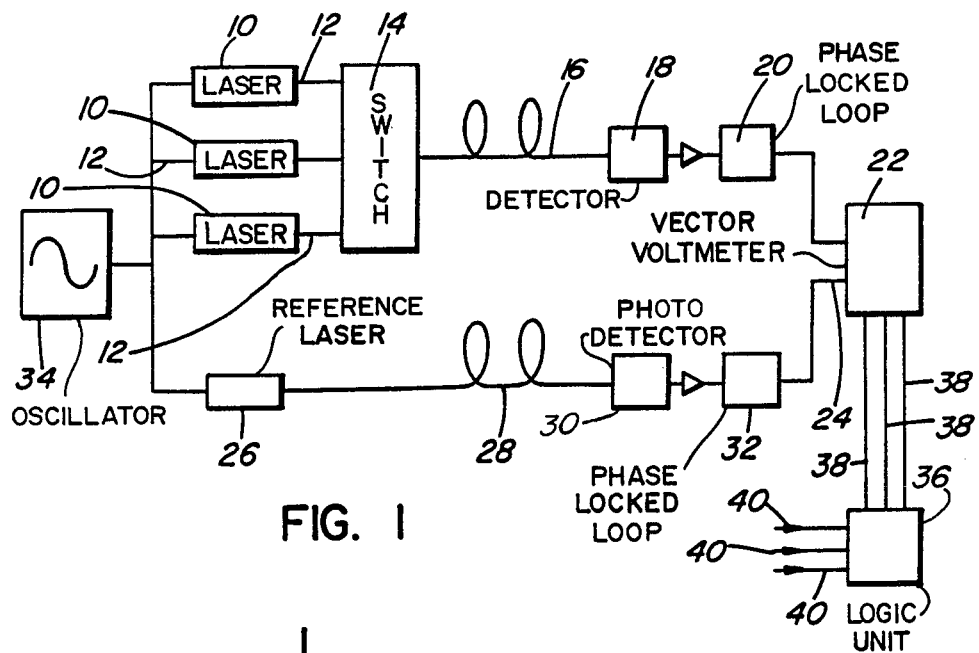
FIG. 1 is a schematic view of apparatus according to the invention.

Referring to FIG. 1 there is shown a test set having three test lasers 10. Outputs of the lasers 10 are launched via pigtails 12 and a switch 14 into a test fiber 16. The switch 14 enables outputs of the three test lasers 10 to be individually launched into the fiber 16. The light output from a remote end of the fiber 16 is detected at a detector 18 at which a corresponding electrical signal is generated. The signal is directed through a phase locked loop 20 to a vector voltmeter 22. The vector voltmeter 22 has a second input 24 derived from a reference laser 26 the output from which is taken through a reference fiber 28, a photodetector 30 and a phase locked loop 32.

The outputs of the lasers 10 and 26 are modulated by a crystal oscillator 34. At the vector voltmeter 22 the phase of the particular test signal received from the test fiber 16 is compared to that of the signal received from the reference fiber 28. The phases are compared successively for signals received from all three of the test lasers 10 to measure the relative propagation times within the test fiber corresponding to these wavelengths.

For testing monomode fiber having a minimum chromatic dispersion wavelength in the order of 1.3 microns, the three lasers are GaInAsP lasers having predominantly single mode output wavelengths respectively of 1.28, 1.30 and 1.32 microns. The output wavelengths of the lasers 10 are accurately determined beforehand by spectral analysis to within 0.01 nm. The reference laser is also a GaInAsP device. The lasers are mounted within laser packages (not shown) having cooling circuits, feedback loops including PIN photodiodes to maintain stabilized output, RC circuits for use in modulating the lasers, and current regulators enabling the temperature to be varied to change the threshold position of the laser and to move the laser operating point along the light output/current input curve. The test lasers are dynamically tested before installation to ensure that they have single mode output even when an oscillatory modulating signal is applied to them. The test lasers have their center wavelength separated by about 20 nm from one another in order to cover a wavelength range appropriate to the system operation wavelength and to ensure that there exists a measurable phase change in changing from one test laser to another.

The photodetectors 18 and 30 are germanium type avalanche photodiodes adapted for detection of wavelengths near 1.3 microns. The outputs of the photodiodes are amplified before being fed to the vector voltmeter 22.

To match the phases at the input to the test fiber the pigtails 12 are cut to ensure that they introduce an identical phase shift when passing from the particular test laser to the input end of the test fiber. Consequently, any relative phase difference at the end of the fiber link can be assumed to be introduced by the fiber link alone. At the applied modulation frequency of 81.9 MHz a phase difference to within ½ degree can be detected between the reference signal and the signal received from the test fiber. A corresponding delay time is deduced since a single cycle at 81.9 MHz corresponds to 12 nsec. The comparison procedure is repeated using the other two lasers.

By using three lasers sufficient data is obtained that the variation of chromatic dispersion with wavelength near the minimum chromatic dispersion region can be derived.

Figure 2:
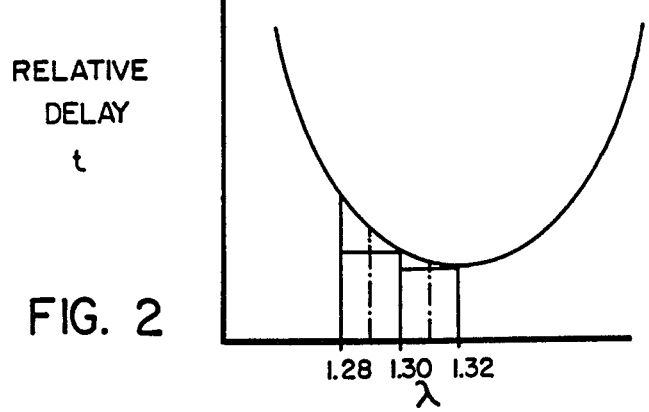
FIG. 2 shows the manner in which propagation time within a momomode fiber varies as a function of wavelength.
Figure 3:
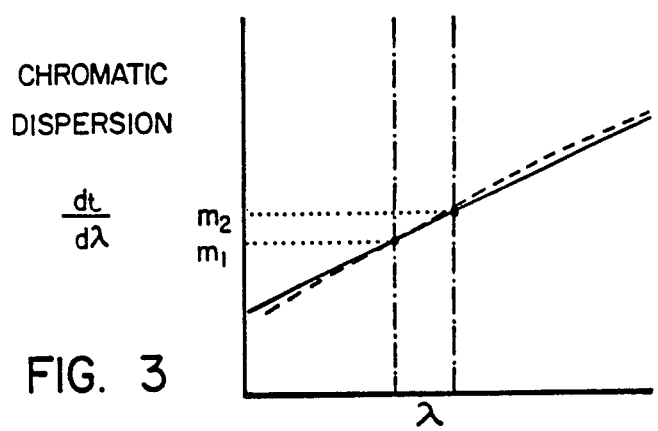
FIG. 3 shows the variation of chromatic dispersion relative to wavelength within a fiber: (i) as measured by the method and apparatus of the invention; and (ii) as measured using a Nd:Yag laser.

Referring to FIG. 2, the chromatic dispersion profile is obtained by calculating two approximate wavelength related values of chromatic dispersion $m_1$ and $m_2$ as follows:

$$m_1 = \frac{t_a - t_b}{\lambda_a - \lambda_b} \text{ at wavelength } \lambda_1 = \frac{\lambda_a + \lambda_b}{2}$$

where $\lambda_a$, $\lambda_b$ and $\lambda_c$ $$m_2 = \frac{t_b - t_c}{\lambda_b - \lambda_c} \text{ at wavelength } \lambda_2 = \frac{\lambda_b + \lambda_c}{2}$$

are the wavelengths of the three test lasers and $t_a$, $t_b$ and $t_c$ are the intervals by which the test signals are delayed relative to the reference signal. As shown in FIG. 3 a linear relationship of chromatic dispersion m relative to wavelength λ is assumed in order to obtain a profile from the two measured values of chromatic dispersion $m_1$ and $m_2$. In a typical performance specification written for fibers used in 1.3 micron fiberoptic systems, chromatic dispersion m must be less than 3.5 ps/km/nm in the range λ equals 1.28 μm to 1.32.

Also shown in FIG. 3 as a broken line is the chromatic dispersion-wavelength profile obtained using the known highly accurate Nd:Yag method. It is evident from the Figure that the profile obtained using the method and apparatus of the present invention relates very closely to that obtained by this more accurate method.

The chromatic dispersion can alternatively be derived by plotting the delays of the test signals relative to the reference signal as a function of wavelength. The variation of signal delay with wavelength is very close to parabolic in a region close to the minimum chromatic dispersion wavelength of the fiber. Thus as an alternative to the method described above, a parabola can be fitted to the three points to obtain a delay/wavelength curve by, for example, the method of least squares. The two approaches yield comparable results.

In performing the method it must be ensured that the oscillator frequency is not of too high a value that the phase change detected at the remote end of the fiber is erroneous owing to the integer number of cycles of one wavelength being greater than the integer number of another wavelength within that length of test fiber. The time delays associated with test lasers at frequency $\lambda_1$, $\lambda_2$ and $\lambda_3$ passing along a common link can be written in the form:

$$t(_1) = \frac{1}{t}\left(N + \frac{\Phi(\lambda_1)}{2\pi}\right)$$

$$t(_2) = \frac{1}{t}\left(N + \frac{\Phi(\lambda_2)}{2\pi}\right)$$

$$t(_3) = \frac{1}{t}\left(N + \frac{\Phi(\lambda_3)}{2\pi}\right)$$

Because a full cycle is equivalent to a time difference of 12 nsec at a frequency of 81.9 MHz, N can be assumed identical throughout the three expressions for a test fiber of length 10 to 50 km.

Although the specific embodiment of the invention has been described in terms of three test lasers and a reference laser, in fact, one of the test lasers could function as the reference laser. However this would mean that both the reference signal and a test wavelength signal must propagate together down the monomode fiber. One of the practical problems of measuring chromatic dispersion of a monomode fiber is launching sufficient light into the fiber that a readily monitored light signal is received at the remote end of the fiber. The problem is compounded if it becomes necessary to launch light from two separate lasers into the same fiber. Hence it is preferred to use a separate reference laser and a separate reference fiber. The method has also been described in terms of switching between the three test lasers. Again theoretically the outputs of the three lasers can be combined for example by a wavelength division multiplexer and then separated at the remote end of the fiber by a wavelength division demultiplexer. Yet again the problem of obtaining a sufficiently high level of detectable light at the remote end of the fiber means that this approach is practically undesirable.

The manner in which a profile of chromatic dispersion as a function of wavelength can be derived from (i) an accurate knowledge of the laser output wavelengths and (ii) comparison of the phases at the remote end of the fiber is expressed theoretically. However as shown in FIG. 1, the generation of the linear relationship between chromatic dispersion and wavelength derived from the signals from the three test lasers can be done relatively simply using a logic unit 36, the logic unit having a first set of inputs 38 corresponding to the accurately determined output wavelengths of the test lasers and a second set of inputs 40 corresponding to the phase differences measured at the vector voltmeter.

What is claimed is:

1. A method for identifying the approximate minimum chromatic dispersion wavelength of an optical fiber comprising:

selecting three test laser diodes having output wavelengths different from one another but located close to a region of low chromatic dispersion (m) of the fiber, in which region m is an approximately parabolic function of wavelength ($\lambda$);

identically modulating the test laser diodes and launching output signals therefrom into the test fiber;

detecting light from the test fiber at a remote end thereof and generating corresponding test electrical signals;

from the test electrical signals deriving the difference in propagation time $t_1 - t_2$ of the first and second laser signal propagating along said fiber at respective wavelengths $\lambda_1$ and $\lambda_2$ and assigning a value of chromatic dispersion $m_{12} = t_1 - t_2/\lambda_1 - \lambda_2$ at an intermediate wavelength $(\lambda_1 + \lambda_2)/2$, deriving the difference in propagation time $t_2 - t_3$ of the second and third laser signals propagating along said fiber at respective wavelengths $\lambda_2$ and $\lambda_3$ and assigning a chromatic dispersion value $m_{23} = t_2 - t_3/\lambda_2 - \lambda_3$ at an intermediate wavelength $(\lambda_2 + \lambda_3)/2$;

using the values $m_{12}$ and $m_{23}$, generating a linear function of m in terms of $\lambda$ corresponding to a differential function of said parabolic region; and from said linear function deriving the value of $\lambda$ at which m is 0, such value being the approximate minimum chromatic dispersion wavelength of the optical fiber.

2. A method as claimed in claim 1 further comprising launching an optical reference signal into a reference fiber co-extensive with the fiber under test, identically modulating the reference laser with the test lasers, and determining the difference in propagation time of the output signals by comparing the phases of the test signals to the phase of an electrical reference signal derived from the optical reference signal at remote ends of the fibers.

3. A method as claimed in claim 2 in which the signals propagating through the test fiber and the reference fiber are detected at avalanche photodiodes.

4. A method as claimed in claim 3 in which the output of the photodiodes is fed to phase locked loops to improve the signal to noise ratio of the received signals.

5. A method as claimed in claim 1 further comprising determining the relative phases of said test signals and deriving said relative propagation times from respective phase differences of the test signals.

6. Apparatus for identifying the approximate minimum chromatic dispersion wavelength of a test optical fiber, the apparatus comprising three test laser diodes having output wavelengths $\lambda_1$, $\lambda_2$ and $\lambda_3$ different from one another but located close to a region of low chromatic dispersion (m) of the fiber, in which region m is an approximately parabolic function of wavelength ($\lambda$), means for identically modulating the test laser diodes, means for launching light output signals from the test laser diodes into the test fiber, means at a remote point of the fiber for detecting light from the test fiber and generating corresponding test electrical signals, means for determining the relative propagation times of the output signals propagating along the fiber at wavelengths $\lambda_1$, $\lambda_2$ and $\lambda_3$, and a logic unit having data inputs corresponding to the wavelength values $\lambda_1$, $\lambda_2$ and $\lambda_3$ and data inputs corresponding to the relative propagation times $t_1$ $t_2$ of said components at $\lambda_1$ and $\lambda_2$ and the relative propagation times $t_2 - t_3$ of said components at $\lambda_2$ and $\lambda_3$, the logic unit adapted to generate:

(i) a first function $m_{12} = t_1 - t_2/\lambda_1 - \lambda_2$
(ii) a second function $\lambda_{12} = (\lambda_1 + \lambda_2)/2$
(iii) a third function $m_{23} = t_2 - t_3/\lambda_2 - \lambda_3$
(iv) a fourth function $\lambda_{23} = (\lambda_2 + \lambda_3)/2$
(v) from data values (i) to (iv), m as a linear function of $\lambda$: and
(vi) a value of $\lambda$ at which m=0.

7. Apparatus as claimed in claim 6 further comprising a reference laser identically modulated with the test lasers, a reference fiber co-extensive with the test fiber, means for launching an output from the reference laser into the reference fiber, and means for detecting the phase of the reference signal received at a remote end of the reference fiber.

8. Apparatus as claimed in claim 6 in which the test lasers are GaInAsP semiconductor lasers having output wavelengths close to 1.3 microns and separated by about 20 nm.

9. Apparatus as claimed in claim 8 in which the test lasers are coupled to the test fiber through pigtail fibers, the apparatus further comprising a switch to selectively direct one or other test laser output into the test fiber.

10. Apparatus as claimed in claim 9 in which the pigtail fibers are trimmed to introduce an identical phase delay.

11. Apparatus as claimed in claim 6 in which the phases of the test signals are compared using a vector voltmeter.

12. Apparatus as claimed in claim 6 further comprising phase comparator means for determining the relative phases of said test signals and means for deriving from said phase comparator means the relative propagation times of the output signals.

* * * * *